(12) United States Patent
Oude Kotte et al.

(10) Patent No.: US 11,623,666 B2
(45) Date of Patent: Apr. 11, 2023

(54) PLUG-IN COUPLING FOR DRIVES

(71) Applicant: SIEMENS MOBILITY GMBH, Munich (DE)

(72) Inventors: Freerk Jacobus Oude Kotte, Stein (DE); Bernd Pfannschmidt, Rosstal (DE)

(73) Assignee: Siemens Mobility GmbH, Munich (DE)

( * ) Notice: Subject to any disclaimer, the term of this patent is extended or adjusted under 35 U.S.C. 154(b) by 363 days.

(21) Appl. No.: 16/643,658

(22) PCT Filed: Aug. 22, 2018

(86) PCT No.: PCT/EP2018/072655
§ 371 (c)(1),
(2) Date: Mar. 2, 2020

(87) PCT Pub. No.: WO2019/042840
PCT Pub. Date: Mar. 7, 2019

(65) Prior Publication Data
US 2020/0269883 A1    Aug. 27, 2020

(30) Foreign Application Priority Data
Sep. 1, 2017   (EP) .................................... 17188991

(51) Int. Cl.
*B61C 9/52*    (2006.01)
*B61C 9/50*    (2006.01)
(Continued)

(52) U.S. Cl.
CPC .................. *B61C 9/52* (2013.01); *B61C 9/50* (2013.01); *B61F 3/04* (2013.01); *B61F 5/52* (2013.01);
(Continued)

(58) Field of Classification Search
CPC ..... B61C 9/52; B61C 9/50; B61F 3/04; B61F 5/52; F16D 3/185; F16D 2001/103; F16D 2300/08
(Continued)

(56) References Cited

U.S. PATENT DOCUMENTS 4,990,121 A * 2/1991 Vosbeck ................. F16D 3/185
464/159
6,931,997 B2   8/2005 Höhl
(Continued)

FOREIGN PATENT DOCUMENTS

CN   101065591 A   10/2007
CN   101718309 A   6/2010
(Continued)

*Primary Examiner* — Greg Binda
(74) *Attorney, Agent, or Firm* — Laurence A. Greenberg; Werner H. Stemer; Ralph E. Locher

(57) ABSTRACT

A drive includes at least one motor with a drive shaft and at least one output shaft which is in particular mechanically connected to a gear. The drive shaft and the output shaft are aligned substantially axially. The drive shaft and the output shaft each have a coupling portion through which a torque can be transmitted from the drive shaft to the output shaft by mechanical coupling. Each coupling portion is connected to the shaft thereof for rotation therewith and the coupling portions can be mechanically coupled by being axially plugged together.

4 Claims, 3 Drawing Sheets

(51) Int. Cl.
  *B61F 3/04* (2006.01)
  *B61F 5/52* (2006.01)
  *F16D 3/18* (2006.01)
  *F16D 1/10* (2006.01)

(52) U.S. Cl.
  CPC ........ *F16D 3/185* (2013.01); *F16D 2001/103* (2013.01); *F16D 2300/08* (2013.01)

(58) Field of Classification Search
  USPC ............... 464/15, 159; 105/117, 118, 131
  See application file for complete search history.

(56) References Cited

U.S. PATENT DOCUMENTS

| | | |
|---|---|---|
| 7,985,141 B2 | 7/2011 | Spensberger |
| 2007/0277639 A1 | 12/2007 | Terasawa et al. |
| 2015/0183312 A1 | 7/2015 | Senoo et al. |
| 2017/0023067 A1 | 1/2017 | Hoves et al. |
| 2018/0297617 A1 | 10/2018 | Hannes et al. |

FOREIGN PATENT DOCUMENTS

| | | | |
|---|---|---|---|
| CN | 104640731 | A | 5/2015 |
| CN | 106062398 | A | 10/2016 |
| CN | 107091278 | A | 8/2017 |
| DE | 2548058 | A1 | 4/1977 |
| DE | 202005015769 | U1 | 1/2006 |
| EP | 3020611 | A1 | 5/2016 |
| GB | 1522909 | A | 8/1978 |
| WO | WO02081280 | A1 | 10/2002 |

\* cited by examiner

PLUG-IN COUPLING FOR DRIVES

BACKGROUND OF THE INVENTION

Field of the Invention

The invention relates to a plug-in coupling for drives.

For drives, in particular for rail vehicles above all with longitudinal drives, to the ends of which an axle gear is fastened in each case, a rotor of a motor can be arranged directly on the input shafts of the two axle gears by way of radially rigid couplings. This nevertheless results, in the case of previously known couplings, in special assembly openings having to be provided in the gears or the housing of the motors having to be provided with openings of this type, wherein assembly openings however negatively affect the housing structure and thus the stability.

The disadvantage with assembly openings of this type is further that they have to be closed, particularly when such drives are operated in an industrial environment or in a climatically demanding environment.

SUMMARY OF THE INVENTION

On this basis the object underlying the invention is to provide a coupling, in particular for rail vehicles, which permits a correct operation of a drive and also ensures simple assembly and verifiability of the functionality of the drive.

The set object is achieved by a drive with
at least one motor with a drive shaft,
at least one output shaft, which is connected mechanically in particular with a gear,
wherein drive shaft and output shaft are aligned substantially axially,
wherein the drive shaft and the output shaft in each case have a coupling portion, by way of which a torque can be transmitted from the drive shaft to the output shaft by means of a mechanical coupling,
wherein each coupling portion is connected to its shaft in a rotatably fixed manner and the coupling portions can be coupled mechanically by being axially plugged together.

On account of the inventive assembly of drive shaft and output shaft, a coupling is produced which is inventively realised only by telescoping the two coupling portions. In this process a coupling portion is connected to the drive shaft and thus to a rotor of a dynamoelectric machine, such as an asynchronous machine or a permanently or electrically excited synchronous machine in a rotatably fixed manner. The respective other coupling portion is connected to the output shaft and thus to a gear shaft and a gear in a rotatably fixed manner.

The gear in each case drives a single wheel or in each case a wheelset shaft of a rail vehicle or another electrically driven vehicle, such as for instance a mining truck or an E-bus.

The substantially axially aligned shafts of the rotor and gear are connected mechanically by means of the two coupling portions and transmit the drive torque of the dynamoelectric machine into the gear while simultaneously compensating for the axial offset, angular offset between the drive and output shaft.

The previously required assembly openings of a housing on the coupling are avoided and the assembly times of such gear arrangements are reduced.

A sealing function, in particular a labyrinth-type seal, is advantageously produced simultaneously by axially telescoping the coupling portions; this also ensures inter alia an adequate sealing effect of the coupling in the case of radial and/or axial movements of the coupling portions.

The invention and further advantageous embodiments of the invention are to be inferred from the exemplary embodiments.

DETAILED DESCRIPTION OF THE INVENTION

Figure 1:
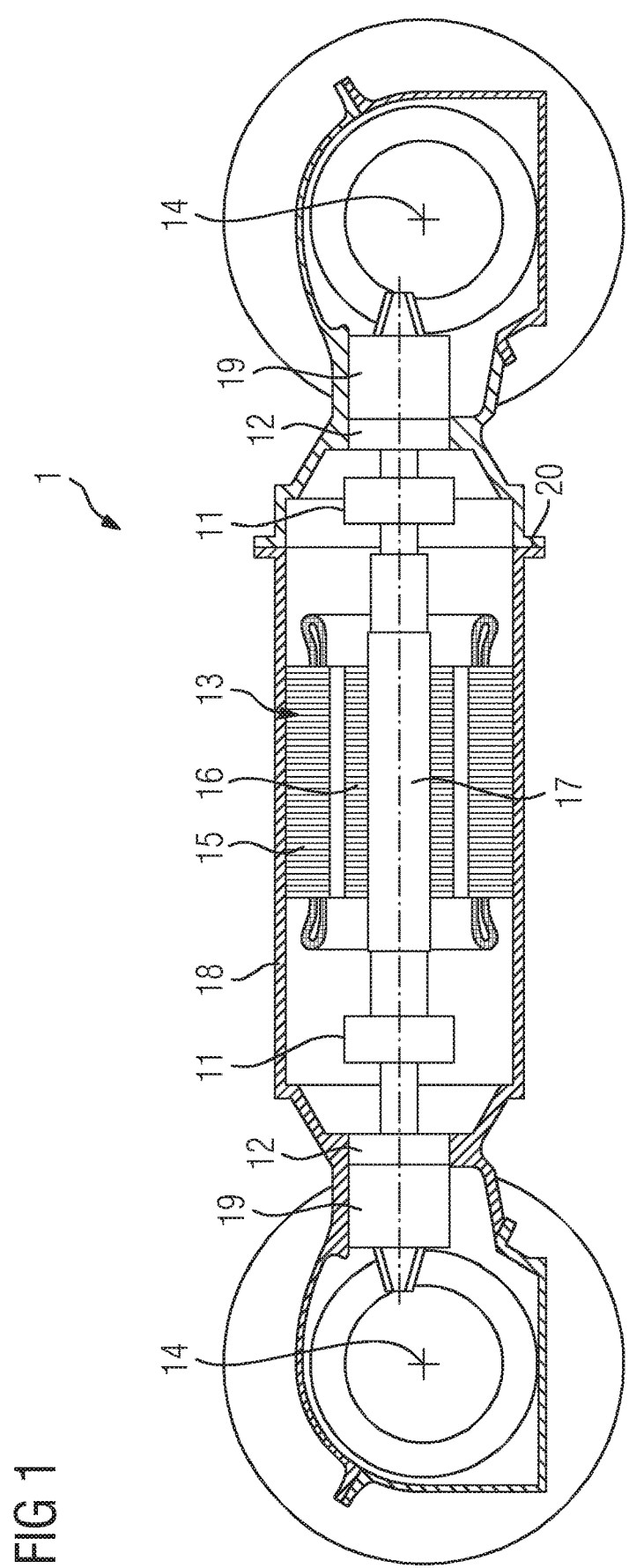
FIG. 1 shows a longitudinal section of a longitudinal drive.

FIG. 1 shows a longitudinal section of a twin axle drive 1, which is arranged both as a central drive and also as a longitudinal drive lying outside in an unpowered bogie or vehicle frame which is not shown in further detail. This twin axle drive 1 is suited in particular to low-floor vehicles. A traction motor 13 is arranged here between two driven axles 14, said traction motor having a stator 15 and a rotor 16 surrounding a motor shaft 17. The motor shaft 17 which can be rotated about an axis of rotation is mounted here by way of bearing arrangements 19. The stator 15 is accommodated in a housing unit 18 in a rotatably fixed manner.

The housing unit 18 is divided into two housing portions, which can be connected to one another on a flange surface 20. Advantageously these flange surfaces 20 run at right angles to the motor shaft 17 of the rotor 16 of the traction motor 13 or in a parallel plane to the driven axles 14. This simplifies the assembly or manufacture of a housing units 18 of this type and thus a twin axle drive 1.

In the present case, the flange surface 20 of the flange is located axially outside of the stator 15. The stator 15 therefore has an axially continuous fit in a housing portion. This simplifies disassembly of these housing portions. Electric terminals of a winding system of the traction motor 13 can thus be arranged particularly favourably so as to be accessible on one side of the stator 15.

Here parts of the traction motor 13, coupling 11, bearing arrangements 19 for gears 12 and traction motor 13 are in the housing portions in each case. In at least one of the housing portions, a brake (not shown in more detail) can also be arranged in particular between the coupling 11 and traction motor 13. Air guiding devices for cooling air flows can optionally be provided on or in the housing portions of the housing unit 18, and also coolant inlets or coolant outlets can be provided on the sleeve of this housing unit 18.

The gear 12 is embodied as a hypoid bevel gear or as a normal angular gear. These compact gears are suited in particular to such twin axle drives, since there the force flow can be deflected almost ideally onto the smallest space.

A wheel or a wheelset with two wheels is driven in each case by means of a gear 12 by way of the driven axle 14. The driven axle 14 of these wheels or these wheelsets run here substantially at right angles to the motor shaft 17 of the traction motor 13.

Figure 2:
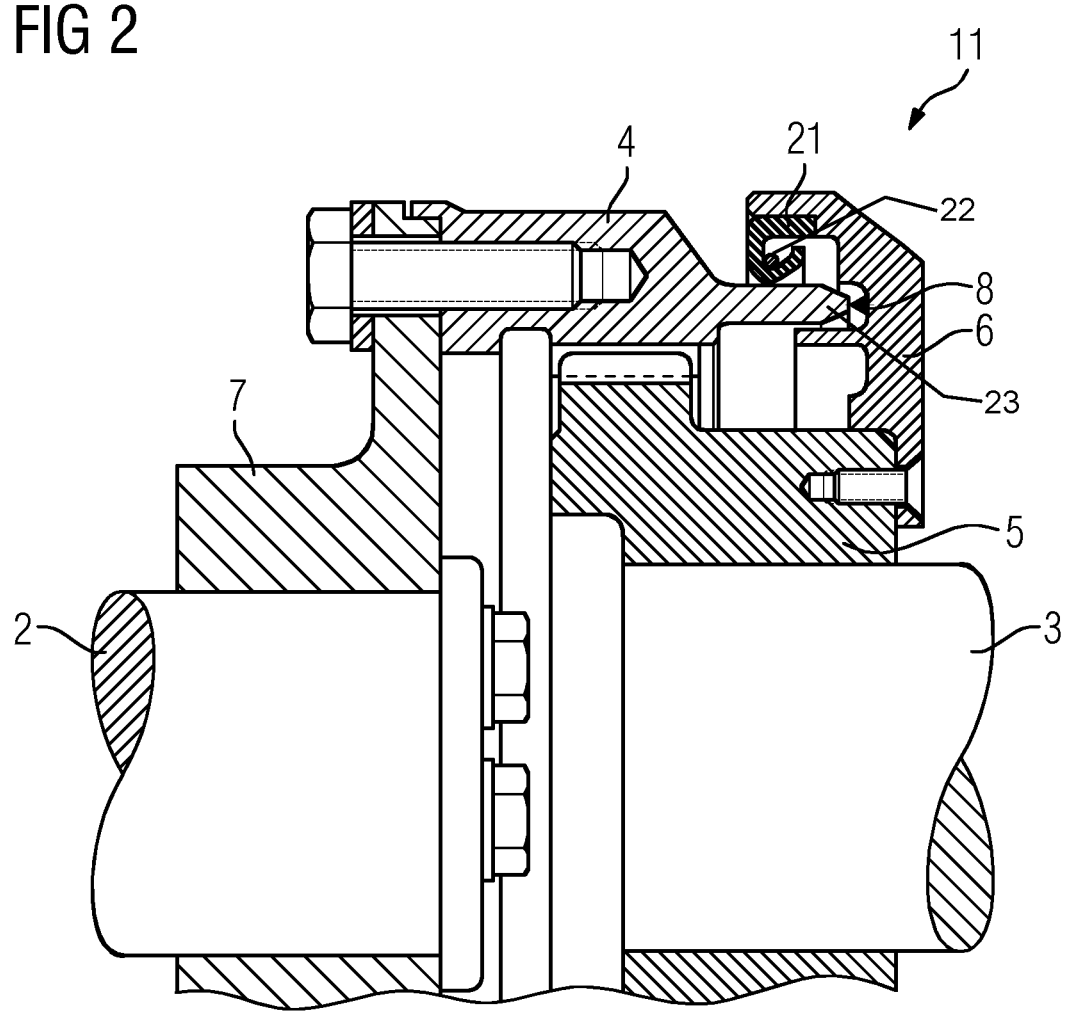
FIG. 2 shows a partial longitudinal section of the longitudinal drive.

FIG. 2 shows a partial longitudinal section of a drive train according to FIG. 1 with a drive shaft 2 and a gear shaft 3.

Here the drive shaft 2 is the motor shaft 17 of the traction motor 17. The motor shaft 17 is connected to the rotor 16 of the traction motor 13 in a rotatably fixed manner, wherein the gear shaft 3 is connected to a corresponding gear 12 in a rotatably fixed manner. The rotatably fixed embodiments between the rotor 16, drive shaft 2 and a first coupling portion 4, and also between a second coupling portion 5 and the gear shaft 3 are achieved for instance by shrinking processes or feather key connections.

The torque transmission based on the dynamoelectric machine, in other words the traction motor 13, now takes place as follows:

By way of the drive shaft 2, the flange 7 fixed thereto, by way of the first coupling piece 4, to the second coupling piece 5, to the gear shaft 3, the gear 12 to the wheel or the wheelset shaft.

The motor shaft 17 therefore drives a gear 12 in each axial direction. According to FIG. 1, an inventive coupling 11 is arranged here in each case, in the drive direction, upstream of the gear 12. It is likewise possible only to provide a coupling 11 of this type or in addition to another coupling concept per twin axle drive 1.

In order to seal this by means of the flange 7 and the coupling portions 4, 5, a coupling 11 is provided by means of axial telescoping. As a result, assembly openings are avoided and the assembly time of a coupling 11 of this type is shortened. A spherical gear coupling can be produced by means of a special embodiment of the internal teeth of the first coupling portion 4 and the external teeth of the second coupling portion 5.

By means of a sealing element 6 which can be fastened with a screw connection to the second coupling portion 5, a counter element 23 required for a labyrinth-type seal effect on the coupling 11 is provided which forms the labyrinth-type seal 8 together with a correspondingly embodied first coupling portion 4.

Furthermore, sealing elements are also formed as a result of the axial plugging-together of the coupling parts 4, 5, particularly as a result of accordingly correspondingly shaped elements or counter elements.

A seal 21 allows for a certain degree of movement between the first coupling portion 4 and the second coupling portion 5 and a spring 22 is disposed within the seal 21.

There is therefore a sealed spherical gear coupling.

The seals are basically embodied so that axial and/or radial movements and/or angular offsets of the coupling portions 4, 5 can be balanced out without lubricant escaping from the coupling 11.

The first coupling portion 4 and the flange 7 are repeatedly mechanically connected to one another by means of paraxial screw connections viewed in the peripheral direction.

It is likewise possible to embody the flange 7 in one piece with the first coupling portion 4. This one-piece part then forms the connection with the coupling portion 5 and thus with the output shaft 2. On account of the corresponding embodiment of counter elements 23 on this one-piece part, a labyrinth-type seal 8 is likewise produced together with sealing elements 6 which are fixed to the coupling part 5.

Figure 3:
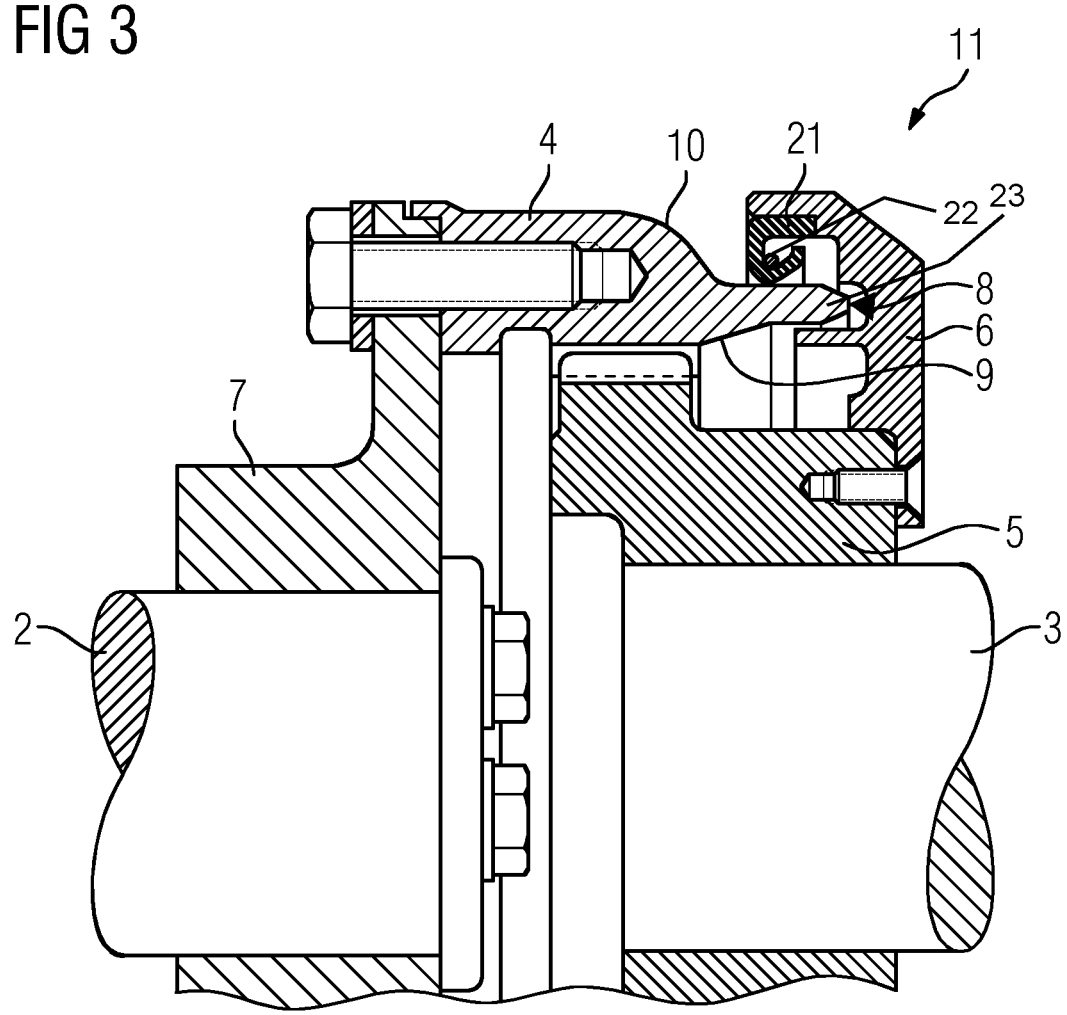
FIG. 3 shows a further partial longitudinal section of the longitudinal drive.

In addition to embodying the coupling 11 according to FIG. 2, the flange 7 and first coupling portion 4 unite per se on the coupling portion 4 or also on the one-piece part, slip radii 10 and/or bevels 9 according to FIG. 3 are provided which simplify the assembly of the coupling 11 and avoid damages.

Couplings of this type 11 are used for instance in twin axle drives 1 of low-floor light rail vehicles, e.g. trams.

The invention claimed is:

1. A drive, comprising:
at least one traction motor having a drive shaft;
at least one output shaft;
a gear connected to said at least one output shaft;
said drive shaft and said at least one output shaft being substantially axially aligned;
a first coupling portion associated with said drive shaft and a second coupling portion associated with said output shaft, said coupling portions configured to be mechanically coupled to each other by being axially plugged together;
said drive shaft being connected to said first coupling shaft and said at least one output shaft being connected to said second coupling shaft in a rotatably fixed manner for transmitting a torque from said drive shaft to said at least one output shaft by mechanical coupling; and
a sealing element fastened on said second coupling portion and a counter element formed on said first coupling portion, said sealing element being shaped to form a labyrinth seal by being axially plugged together with said counter element formed on said first coupling portion.

2. The drive according to claim 1, wherein said gear is mechanically connected to said at least one output shaft.

3. The drive according to claim 1, wherein said coupling portions configured to be axially plugged together are parts of a spherical tooth coupling, and said coupling portions have teeth.

4. The drive according to claim 3, wherein said spherical tooth coupling is configured to be sealed by said coupling portions.

* * * * *